US012762747B2

(12) United States Patent
Belkine

(10) Patent No.: US 12,762,747 B2
(45) Date of Patent: *Oct. 13, 2026

(54) ADVANCED VIDEO ENCODING IN A REMOTE DESKTOP ENVIRONMENT

(71) Applicant: Microsoft Technology Licensing, LLC, Redmond, WA (US)

(72) Inventor: Artem Belkine, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 212 days.

This patent is subject to a terminal disclaimer.

(21) Appl. No.: 18/651,170

(22) Filed: Apr. 30, 2024

(65) Prior Publication Data

US 2025/0336095 A1 Oct. 30, 2025

(51) Int. Cl.
*G06T 9/00* (2006.01)
*G06F 9/451* (2018.01)

(52) U.S. Cl.
CPC ................ *G06T 9/00* (2013.01); *G06F 9/452* (2018.02)

(58) Field of Classification Search
CPC .................................. G06F 9/452; G06T 9/00
See application file for complete search history.

(56) References Cited

U.S. PATENT DOCUMENTS

2004/0255227 A1 12/2004 Borsum
2006/0053212 A1 3/2006 Lin
2007/0046980 A1 3/2007 Coleman
2008/0209048 A1* 8/2008 Sampath ............... H04L 67/148 709/227
2009/0285496 A1* 11/2009 Collins .................. H04N 19/50 382/232
2010/0077085 A1 3/2010 Cohen
2010/0146127 A1* 6/2010 Schmieder .............. G06F 9/545 709/228
2010/0228871 A1* 9/2010 Abdo .................... H04L 67/131 715/790

(Continued)

FOREIGN PATENT DOCUMENTS

CN 114117283 A 3/2022
WO 2021130500 A1 7/2021

OTHER PUBLICATIONS

International Search Report and Written Opinion received for PCT Application No. PCT/US2025/015167, Apr. 16, 2025, 13 pages.

(Continued)

*Primary Examiner* — Daniel F Hajnik
*Assistant Examiner* — Chris Alejandro Puntier
(74) *Attorney, Agent, or Firm* — Shook, Hardy & Bacon L.L.P.

(57) ABSTRACT

Methods, computer systems, and computer-storage media are provided for facilitating advanced video encoding in a remote desktop environment. In embodiments, graphical data for presenting in association with a remote desktop client device is obtained at a video driver of a remote desktop server. The graphical data may be provided to a video encoder logically separated from the video driver. The video encoder can then encode the graphical data. The encoded graphical data may be provided to a remote access protocol stack in a terminal service of the remote desktop server for transmitting the encoded graphical data to the remote desktop client device.

17 Claims, 7 Drawing Sheets

(56) References Cited

U.S. PATENT DOCUMENTS

| | | | | |
|---|---|---|---|---|
| 2011/0304522 | A1 | 12/2011 | Zeng | |
| 2012/0082395 | A1 | 4/2012 | Abdo | |
| 2013/0156269 | A1 | 6/2013 | Matsui | |
| 2013/0294689 | A1* | 11/2013 | Jia | H04N 19/136<br>382/166 |
| 2014/0010289 | A1 | 1/2014 | Lukasik | |
| 2014/0079113 | A1 | 3/2014 | Newton | |
| 2015/0063451 | A1* | 3/2015 | Zhu | H04L 65/70<br>375/240.09 |
| 2015/0254048 | A1 | 9/2015 | Morton | |
| 2017/0046013 | A1 | 2/2017 | Reskusich | |
| 2017/0323418 | A1 | 11/2017 | Dror | |
| 2017/0345125 | A1 | 11/2017 | Golas | |
| 2018/0063555 | A1* | 3/2018 | Raduchel | G06F 9/452 |
| 2019/0028691 | A1 | 1/2019 | Hinds | |
| 2019/0082138 | A1 | 3/2019 | Pan | |
| 2021/0287341 | A1 | 9/2021 | Birkbeck | |
| 2022/0345676 | A1 | 10/2022 | Nakajima | |
| 2023/0031245 | A1 | 2/2023 | Longhurst | |
| 2025/0337965 | A1 | 10/2025 | Belkine | |

OTHER PUBLICATIONS

"DisplayMonitor Class", Retrieved From: https://learn.microsoft.com/en-us/uwp/api/windows.devices.display.displaymonitor?view=winrt-22621, 2024, 5 Pages.

"IPropertyStore interface (propsys.h)", retrieved from internet: https://learn.microsoft.com/en-us/windows/win32/api/propsys/nn-propsys-ipropertystore, Feb. 2024, 2 pages.

"Audio Devices DDI References" accessed on URL: https://learn.microsoft.com/pdf?url=https%3A%2F%2Flearn. microsoft.com%2Fen-us%2Fwindows%2Fwin32%2Fapi%2F_audio%2Ftoc.json, Oct. 3, 2023, 231 pages.

Final Office Action mailed on Sep. 18, 2025, in U.S. Appl. No. 18/651,187, 32 pages.

International Search Report and Written Opinion received for PCT Application No. PCT/US2025/016178, mailed on Jun. 4, 2025, 15 pages.

Non-Final Office Action mailed on Jun. 2, 2025, in US Application No. 18/651, 187, 31 pages.

Notice of Allowance mailed on Apr. 17, 2026, in U.S. Appl. No. 18/651,187, 08 pages.

Notice of Allowance mailed on Dec. 17, 2025, in U.S. Appl. No. 18/651,187, 08 pages.

Twiest, et al., "How to configure multiple monitors for remote desktop use", accessed on link https://www.techtarget.com/searchvirtualdesktop/tip/How-to-configure-multiple-monitors-for-remote-desktop-use, Feb. 27, 2023, 4 pages.

* cited by examiner

ADVANCED VIDEO ENCODING IN A REMOTE DESKTOP ENVIRONMENT

BACKGROUND

Remote desktop services enable users to access and control a remote computer or virtual machine from another device, providing a virtual desktop experience. Typically, a client device communicates with a remote desktop server via a terminal service using a remote desktop protocol (RDP) stack to facilitate communication. In conventional implementations, the RDP stack of the remote desktop server encodes data, such as graphical data, before transmitting it to the client device. Performing data encoding at the RDP stack, however, uses an extensive amount of computing resources to provide the raw data to the RDP stack for encoding. For example, to provide the unencoded data to the RDP stack, the unencoded data is synchronized and copied between the video driver and the RDP stack, thereby using an extensive amount of CPU and memory. Accordingly, this encoding process consumes significant CPU and memory resources, particularly as monitor resolutions increase. For instance, High Dynamic Range (HDR) monitors may require double the amount of memory and CPU usage for encoding due to their higher pixel density.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, facilitating data encoding in a remote desktop environment in an efficient and effective manner. In particular, data encoding is performed in association with the video driver, thereby enabling data encoding to occur in the same process as obtaining the unencoded (e.g., raw) data. In this way, rather than synchronizing and copying the unencoded data to the RDP stack for encoding before transmitting to a client device, the unencoded data is obtained at the video driver and encoded in association therewith. The encoded data can then be provided to a terminal service, such as the RDP stack, for transmitting to the client device.

In operation, a video encoding manager and/or a video encoder(s) associated therewith may be initialized in association with the video driver to perform the data encoding. Such a video encoding manager and/or video encoder(s) may be logically separated from the video driver via an encoding interface. Further, the video encoding manager and/or a video encoder(s) associated therewith may perform tasks related to the internal protocol to communicate the encoded data to the RDP stack. As such, the video driver can operate as a pure or generic driver, without directly performing data encoding and/or data encapsulation (e.g., in a format suitable to transmit the data to the RDP stack). Accordingly, in embodiments described herein, the video driver is configured to provide unencoded graphical data to a video encoding manager, which can then facilitate data encoding (e.g., via a video encoder) and/or data encapsulation. In this way, data encoding and/or data encapsulation is performed in association with the video driver, but logically separated therefrom.

BRIEF DESCRIPTION OF THE DRAWINGS

The technology described herein is described in detail below with reference to the attached drawing figures, wherein.

DETAILED DESCRIPTION

Figure 1:
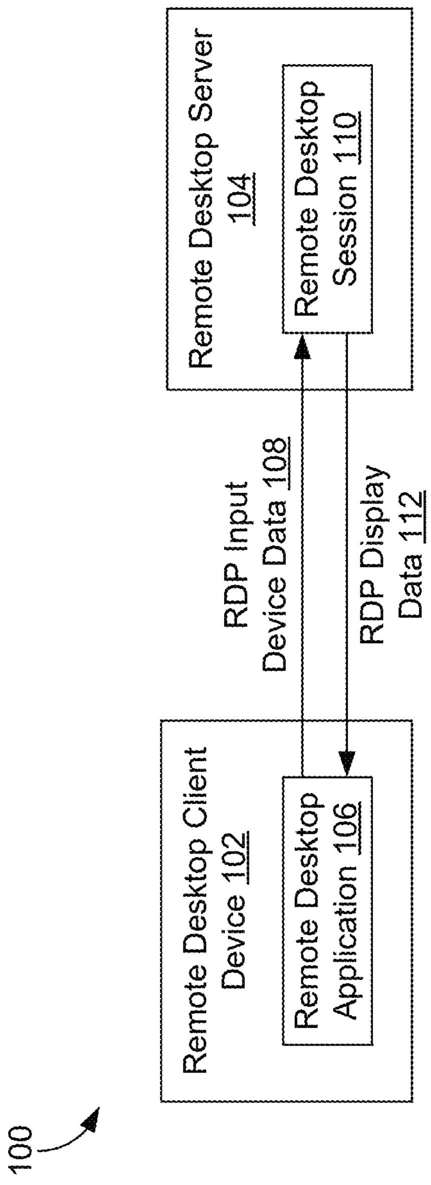
FIG. 1 is a block diagram illustrating an example operation of a remote desktop environment, suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

Remote desktop services allow users to access and control a remote computer or virtual machine from another device. In this regard, users can connect to workstations, servers, or other computers remotely, thereby providing a virtual desktop experience. In this way, users can perform various tasks on a computing device as if physically present at the remote computer. Such various tasks may include, for example, running applications, accessing files, managing settings, and performing administrative tasks.

Generally, in conventional implementations, a client device includes a remote desktop application that is used to communicate with a remote desktop server via a terminal service executing at the remote desktop server. In establishing a connection between the remote desktop application of the client device and the terminal service of the remote desktop server, a remote desktop protocol (RDP) stack is initiated at the remote desktop server. In a remote desktop environment, RDP technology is utilized to enable efficient communication between the client device and the remote desktop server. The RDP stack facilitates the RDP communication between the client device and the remote desktop server. For example, the RDP stack can manage how data is packaged, transmitted, and/or received during remote desktop sessions. The RDP stack may also perform session management (e.g., authentication, encryption, and connection negotiation between the client device and the remote desktop server) and input/output management (e.g. transmission of user input from the client device to the remote desktop server and delivery of output from the remote desktop server to the client device).

In addition, in conventional implementations, the RDP stack of the remote desktop server generally encodes data to transmit to the client device. For example, the RDP stack may use various encoding techniques to encode graphical data prior to transmitting the data from the remote desktop server to the client device. In operation, a video driver obtains graphical data from an operating system of the remote desktop server. Such graphical data may include, for example, information about graphics, GUI elements, video data or content, or other graphical data to display at the client device. In accordance with obtaining data, such as graphical data, the video driver processes the data and generates the appropriate output for display at the client device. For example, the video driver may perform format conversion, scaling, color space conversion, and/or optimization for the target display (e.g., in accordance with capabilities and specifications of the client device). In this way, the video driver may interact with the operating system to generate graphical output based on instructions received from applications and/or the operating system. The processed graphical data may be provided or accessible to the RDP stack, which then encodes the data and transmits the encoded data to the client device during a remote desktop session. In particular, the video driver, in some cases along with the user mode remote desktop protocol (UMRDP), is responsible for providing the unencoded data to the terminal service and, in particular, the RDP stack of the remote desktop server for encoding.

Performing data encoding at the RDP stack, however, uses an extensive amount of CPU and memory resources. In particular, encoding data outside of the data acquisition process (also referred to as the driver process) results in CPU and memory resources being unnecessarily used to provide the raw data to the RDP stack of the terminal service. For example, a video driver may obtain megabytes of unencoded data, which is then passed to the RDP stack for encoding to compress the data before it is transmitted over the network to the client device. To provide the unencoded data to the RDP stack, the unencoded data is synchronized and copied between the video driver (or the data acquisition process) and the RDP stack (or the data transmission process). Synchronization and copying of data uses an extensive amount of CPU and memory resources, particularly when raw data is synchronized and copied. Such an extensive use of CPU and memory resources to perform data synchronization and copying between the two processes to perform data encoding via the RDP stack is exacerbated as monitor resolutions increase. For example, High Dynamic Range (HDR) monitors have eight bytes per pixel, which is double the amount of bytes per pixel of traditional monitors. As such, in instances in which HDR monitors are used, the amount of memory and CPU usage to provide the data to the RDP stack to perform the encoding process is doubled.

As such, embodiments described herein are directed to facilitating data encoding in a remote desktop environment in an efficient and effective manner. In particular, data encoding is performed in association with the video driver, thereby enabling data encoding to occur in the same process as obtaining the unencoded (e.g., raw) data. In this way, rather than synchronizing and copying the unencoded data to the RDP stack for encoding before transmitting to a client device, the unencoded data is obtained at the video driver and encoded in association therewith. The encoded data can then be provided to a terminal service, such as the RDP stack, for transmitting to the client device.

As described herein, in some embodiments, a video encoding manager and/or a video encoder(s) associated therewith may be initialized in association with the video driver to perform the data encoding. Further, the video encoding manager and/or a video encoder(s) associated therewith may perform tasks related to the internal protocol to communicate the encoded data to the RDP stack. As such, the video driver can operate as a pure or generic driver, without directly performing data encoding and/or data encapsulation (e.g., in a format suitable to transmit the data to the RDP stack). Accordingly, in embodiments described herein, the video driver is configured to provide unencoded graphical data to a video encoding manager, which can then facilitate data encoding (e.g., via a video encoder) and/or data encapsulation. In this way, data encoding and/or data encapsulation is performed in association with the video driver, but logically separated therefrom.

In operation, to facilitate graphical data encoding and/or data encapsulation in association with a video driver, or data acquisition process, the video driver may obtain an encoding indicator. As used herein, an encoding indicator generally indicates or provides an instruction related to graphical data encoding. An encoding indicator may include a video encoding manager identifier and/or a video encoder identifier. In embodiments, an RDP stack may provide the encoding indicator to the video driver, for example, via Input/Output Control (IOCTL). The encoding indicator may instruct the video driver to load a particular video encoding manager and/or video encoder (e.g., using a video encoding manager identifier and/or a video encoder identifier, respectively). In embodiments, the video encoding manager is loaded on top of the video driver in the same data acquisition process as the video driver. The video driver can communicate with the video encoding manager and/or video encoders via an encoding interface. The encoding interface enables separation of the video driver from the data encoding performed in association with the video encoding manager and/or video encoder.

Advantageously, performing data encoding in association with the video driver, as described herein, minimizes CPU and memory utilization, as opposed to performing data encoding via the RDP stack. For example, CPU and memory utilization to synchronize and copy data between the video driver and the RDP stack may be minimal to none in accordance with embodiments described herein. Further, separating encoding from the RDP stack facilitates a more secure implementation. For instance, as a data acquisition or driver process is a session specific process, there is more isolation and reliability in instances of errors during encoding (e.g., does not result in the terminal service disconnecting all active user sessions). Logically separating data encoding and/or data encapsulation from the video driver enables the video driver to perform more efficiently. Further, logically separating data encoding from the video driver enables secure and efficient updates in association with video encoders. For example, video encoders may be added or modified in association with the video encoding manager without impacting the video driver.

Overview of Exemplary Environments for Facilitating Advanced Video Encoding in a Remote Desktop Environment As described, a user may desire to access computing applications remotely, e.g., applications that are running on a separate computing device. In this regard, a remote desktop environment or service may be used to provide a user with such access. A remote desktop environment or service includes a computer system that maintains applications that can be remotely executed by client computer systems. Input is entered at a client computer system and traversed over a network (e.g., using protocols based on the International Telecommunications Union (ITU) T.120 family of protocols such as Remote Desktop Protocol (RDP)) to an application on a server, such as remote desktop server or terminal server. The application processes the input as if the input were entered at the server.

FIG. 1 provides a diagrammatic overview of the operation of a remote desktop environment 100. The remote desktop environment 100 includes a remote desktop client device 102 and a remote desktop server 104. Remote desktop client device 102 can be a client device on a client-side of remote desktop environment 100, while remote desktop server 104 can be on a server-side of remote desktop environment 100. Remote desktop server 104 may comprise server-side software designed to work in conjunction with client-side software on remote desktop client device 102 so as to implement any combination of the features and functionalities discussed in the present disclosure. The remote desktop environment 100 shown in FIG. 1 is an example of one suitable environment and is not intended to suggest any limitation as to the scope of use or functionality of embodiments disclosed throughout this document. Neither should the exemplary remote desktop environment 100 be interpreted as having any dependency or requirement related to any single component or combination of components illustrated therein. For example, any number of remote desktop client devices 102 and/or remote desktop servers 104 may exist within a remote desktop environment 100. For instance, multiple remote desktop client devices 102 may communicate with the remote desktop server 104.

A remote desktop client device 102 and a remote desktop server 104 can communicate through a network, which may include any number of networks, such as, for example, a local area network (LAN), a wide area network (WAN), the Internet, a cellular network, a peer-to-peer (P2P) network, a mobile network, or a combination of networks. In embodiments, the remote desktop client device 102 and the remote desktop server 104 communicate using remote desktop protocol (RDP). Although illustrated and discussed as using RDP for communication, any remote access protocol may be used to enable the remote desktop client device 102 to connect to remote desktop server 104. Other examples of remote access protocol include, but are not limited to, Secure Shell (SSH), Virtual Network Computing (VNC), and TeamViewer.

The remote desktop client device 102 can be any kind of computing device capable of facilitating a remote desktop session. For example, in an embodiment, the remote desktop client device 102 can be a computing device such as computing device 700, as described below with reference to FIG. 7. In embodiments, the remote desktop client device 102 can be a personal computer (PC), a laptop computer, a workstation, a mobile computing device, a PDA, a cell phone, or the like.

The remote desktop client device 102 can include one or more processors, and one or more computer-readable media. The computer-readable media may include computer-readable instructions executable by the one or more processors. The instructions may be embodied by one or more applications, such as remote desktop application 106 shown in FIG. 1. The application(s) may generally be any application capable of facilitating a remote desktop session(s). In some implementations, the application(s) comprises a web application, which can run in a web browser, and could be hosted at least partially server-side (e.g., via a server). In addition, or instead, the application(s) can comprise a dedicated application. In some cases, the application is integrated into the operating system (e.g., as a service).

The remote desktop client device 102 is generally operated by an individual or entity that initiates a remote desktop session. In this way, an individual may desire to access and interact with a computer or desktop environment remotely (e.g., over a network connection). In a remote desktop session, a user's inputs (e.g., mouse movements, keyboard inputs, touch gestures, and the like) are transmitted to the remote desktop server 104, and the graphical output of the remote desktop server 104 is provided to the remote desktop client device 102.

In operation, the remote desktop client device 102 runs a remote desktop application 106 that sends remote desktop protocol (RDP) input device data 108, such as for example, keyboard data and mouse click data, to a remote desktop session 110 that has been spawned in the remote desktop server and receives RDP display data 112, such as user interface graphical data. Generally, the remote desktop application 106 is a thin client process and most processing is provided on the remote desktop server 104.

When a remote desktop client device connects to a remote desktop server via a remote desktop server gateway (not shown), the gateway may open a socket connection with the remote desktop server and redirect client traffic on the RDP port or a port dedicated to remote access services. The gateway may also perform certain gateway specific exchanges with the client using a terminal servicer gateway protocol transmitted over HTTPS.

During the remote desktop session 110, an application running in the session generates output in response to the received input 108, and the output, or RDP display data, 112 is transferred over the network to the remote desktop client device 102. The remote desktop client device 102 runs a remote desktop application 106 that presents the output data. Thus, the input is received and output presented at the remote desktop client device 102, while processing actually occurs at the remote desktop server 104. A session can include a shell and a user interface such as a desktop, the subsystems that track mouse movement within the desktop, the subsystems that translate a mouse click on an icon into commands that effectuate an instance of a program, or the like. It should be understood that the foregoing discussion is exemplary and the presently disclosed embodiments may be implemented in various client/server environments and not limited to a particular remote desktop services product. One example of remote desktop system is Remote Desktop Services provided by Microsoft® Corporation.

Figure 2:
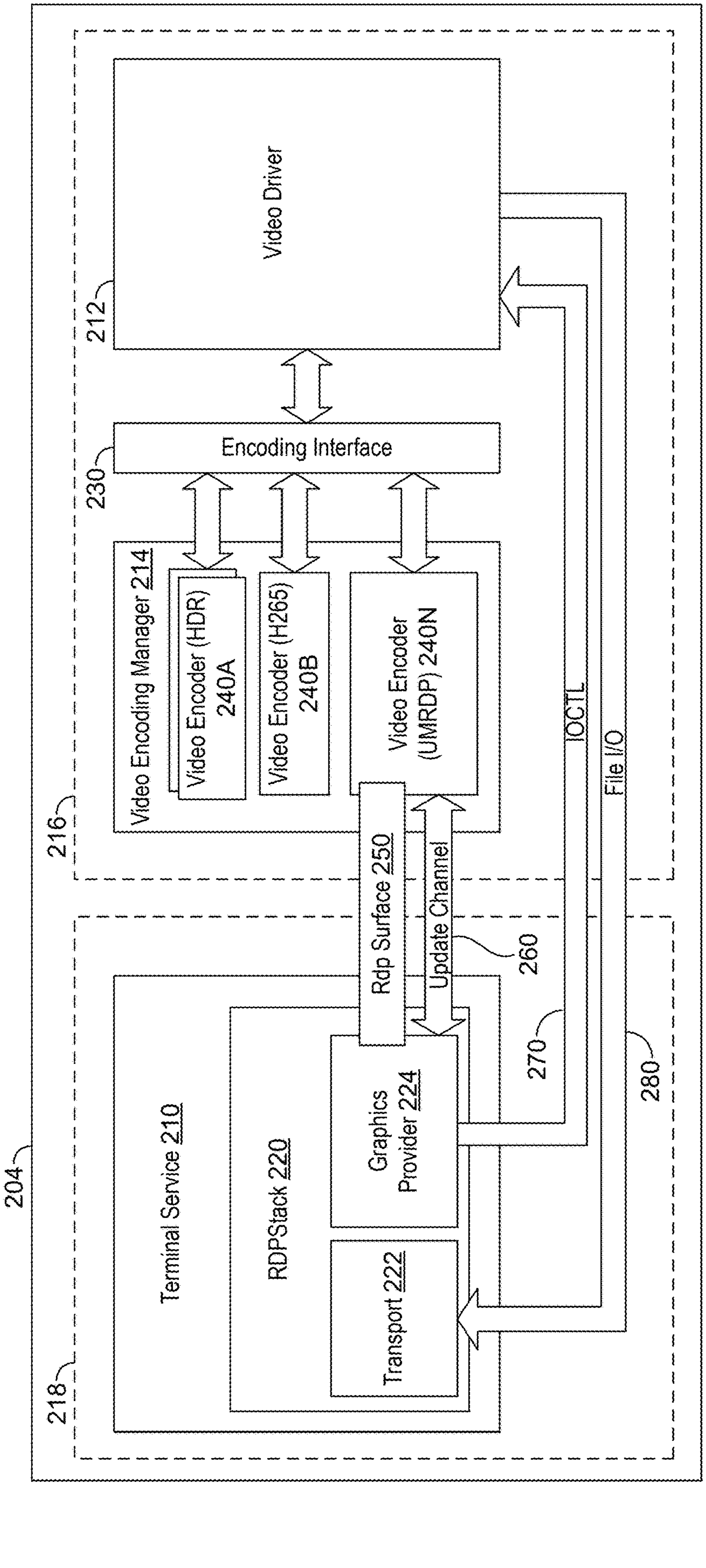
FIG. 2 provides an example remote desktop server that facilitates efficient and effective graphical data encoding, in accordance with aspects of the technology described herein.

FIG. 2 provides an example remote desktop server that facilitates efficient and effective graphical data encoding. As illustrated in FIG. 2, the remote desktop server 204 facilitates graphical data encoding being performed separately from the terminal service 210. In particular, graphical data is encoded in association with the video driver 212 (e.g., via the video encoding manager 214) before being communicated to the terminal service 210. In this way, graphical data encoding is performed in association with the data acquisition process 216 (or driver process), which is separate from the session managing process 218 (or RDP stack process). The data acquisition process 216 is generally configured to acquire graphical data, for example, via the operating system, application, and/or the like. The session managing process 218 is generally configured to manage remote desktop sessions, including performing user authentication, session creation, session management, and data transmission between a remote desktop client device and the remote desktop server 204 during remote desktop sessions. The session managing process 218 may operate at the application layer, while the data acquisition process 216 may operate at a different layer level (e.g., a lower level) than the session managing process.

In operation, a remote desktop client device may communicate with the remote desktop server 204 via a remote desktop application operating on the remote desktop client device. In particular, the remote desktop client device, via the remote desktop application (e.g., remote desktop application 106 of FIG. 1), may connect with the terminal service 210 running on the remote desktop server 204. In this regard, the remote desktop application may initiate and communicate a connection request to initiate a remote desktop session. A connection request may be initiated in a number of ways. For example, in some cases, a connection request may be initiated based on the remote desktop application (e.g., 106 of FIG. 1) being launched. In other cases, a connection request may be initiated based on a user selection via the remote desktop application. In some cases, in accordance with initiating the connection request, communication between the remote desktop client device (e.g., 102 of FIG. 1) and the remote desktop server 204 may be exchanged to perform authentication (e.g., verifying username and password of user), among other things.

In accordance with a successful authentication, a connection is established between the remote desktop client device and the remote desktop server 204. Establishing a connection may include, for example, negotiating protocol versions, security settings, and/or other parameters to ensure a stable and secure connection between the remote desktop client device and the remote desktop server 204. For example, the remote desktop client device and the remote desktop server 204 may negotiate connection parameters and establish a secure communication channel using the RDP that encrypts the data exchanged between the remote desktop client device and the remote desktop server 204. Upon establishing the connection, the terminal service 210 may facilitate initiating a new remote desktop session for the authenticated user. Initializing a remote desktop session may include setting up the user's desktop environment, preparing the display, and/or loading necessary resources for the remote desktop session.

In accordance with initializing the remote desktop session, graphical data can be rendered for display on the remote desktop client device. In this regard, and at a high level, graphical output generated by applications running on the remote desktop server are captured and encoded for transmission to the remote desktop client device. The remote desktop client device receives the encoded graphical data and renders it on the local display. In this way, the user may be provided with control over the remote desktop, which is now an active remote desktop session within the operating system. The user can interact with the desktop environment, launch applications, access files, and perform tasks as if the user was physically present at the remote desktop server 204. In accordance with such interactions, the remote desktop client device may provide or transmit GUI elements, keyboard input, mouse movements, and/or other user interactions between the client device and remote server.

With respect to the remote desktop server 204, the remote desktop server 204 includes a terminal service 210, a video driver 212, and a video encoding manager 214. As shown, the terminal service 210 corresponds with the session managing process 218, which is generally configured to manage remote desktop sessions including performing user authentication, session creation, session management, and data transmission between the client and server during remote desktop sessions. The video driver 212 and the video encoding manager 214 correspond with the data acquisition process 216, which is generally configured to manage data acquisition (e.g., acquire and encode data). In this regard, the data acquisition process 216 includes acquiring and encoding graphical data before the data is communicated to the terminal service 210.

The terminal service 210 communicates with the remote desktop client device (e.g., remote desktop client device 102 of FIG. 1) and manages remote desktop sessions. A remote desktop session generally refers to a period during which a user accesses and interacts with a remote desktop environment or applications on a remote computer from a client or local device. As can be appreciated, the terminal service 210 can manage multiple remote desktop sessions, for example, associated with multiple users.

The terminal service 210 includes a RDP stack 220, which may be loaded therein. The RDP stack 220 includes software components and protocols that implement and/or manage communication between a remote desktop client device and the remote desktop server 204 (e.g., using RDP). Although illustrated as an RDP stack, a remote access protocol stack of any configuration may be used.

The RDP stack 220 may be loaded at any time. In one embodiment, the RDP stack 220 is loaded when a connection request is obtained, for instance, when a user attempts to initiate a remote desktop session. In another embodiment, the RDP stack 220 is loaded when the terminal service 210 is loaded. For example, when the remote desktop server 204 boots and loads the core operating system, the terminal service 210 and the RDP stack 220 may be initiated or loaded. In accordance with initializing the RDP stack 220, it listens for incoming data, such as connection requests, for example, from a remote desktop client device(s) and manages the communication between a remote desktop client device(s) and the remote desktop server 204. For instance, in association with a connection request, the RDP stack 220 may perform various tasks, such as authentication and session management. Once negotiation is successful and the connection is established, the RDP stack facilitates data transport between the remote desktop client device and the remote desktop server 204. For example, the RDP stack 220 may interact with the video driver 212 to transmit graphical data from the virtual desktop to the display of the remote desktop client device.

In some embodiments, the RDP stack 220 may include a transport 222 and a graphics provider 224. The transport 222 and/or graphics provider 224 may be initiated or instantiated at any time. As one example, transport 222 and/or graphics provider 224 may be initiated in accordance with activation or initiation of the RDP stack 220 and/or a remote desktop session. For example, assume a user initiates a connection request to connect with the remote desktop server 204. In such a case, the RDP stack 220 may be initiated at the remote desktop server 204 when the remote desktop client device communicates a connection request. In this way, when a remote desktop client device initiates a connection to the remote desktop server 204, the RDP stack 220 may become active to handle the incoming connection request. As part of such an activation, the transport 222 and/or graphics provider 224 may be initialized.

The transport 222 is generally configured to manage data communication between a remote desktop client device and the remote desktop server 204. In this regard, when a remote desktop session is initiated (e.g., a user initiates a remote desktop session), the transport 222 manages communication, or data packet flow, between the remote desktop client device and the remote desktop server 204. The transport 222 may perform various tasks, such as packetization, encryption, compression, and/or ensuring reliable delivery of data (e.g., via packet acknowledgments, retransmissions, and/or flow control). The transport 222 can package the remote desktop protocol onto the underlying network protocol, such as Transmission Control Protocol (TCP) or User Datagram Protocol (UDP), for communication.

The graphics provider 224 is generally configured to facilitate display of graphical content on the remote desktop client device during a remote desktop session(s). In some cases, the graphics provider 224 may be a Universal Windows Platform Remote Desktop Protocol (UMRDP) graphics provider. In some embodiments, the graphics provider 224 may obtain graphical data for transmitting to the remote desktop client device. For example, and as described herein, encoded graphical data may be provided to the graphics provider 224 (e.g., from a video encoder 240, such as video encoder 240N). In cases in which the graphics provider 224 obtains encoded graphical data, the graphics provider 224 may provide the encoded graphical data to the transport 222 for transmission over the network. In this way, the graphics provider 224 may manage efficient transmission of graphical data, such as screen updates, images, and video, between a remote desktop client device and the remote desktop server 204. As described herein, in conventional implementations, a graphics provider may encode graphical data generated on the remote desktop server before the data is transmitted to the remote desktop client device. In particular, a graphics provider may acquire unencoded graphical data from a video driver and encode the graphical data. In accordance with implementations described herein, however, the graphical data is encoded in association with the data acquisition process (e.g., via the video encoding manager 214) and, as such, is not encoded in association with terminal service 210 (e.g., the RDP stack or the graphics provider). Accordingly, although the graphics provider 224 is illustrated, in some embodiments, the graphics provider 224 is not implemented and/or used.

As described, the terminal service 210 manages remote desktop sessions. In particular, the terminal service 210 may initiate a remote desktop session upon obtaining or receiving a connection request and/or establishing a connection. For example, in obtaining a connection request, the terminal service 210 may instruct the operating system of the remote desktop server 204 to initiate or start a remote desktop session (e.g., upon authentication). As such, the operating system of the remote desktop server 204 can initiate a remote desktop session in response to such an instruction from the terminal service 210. In initiating a remote desktop session, a video driver 212 is activated (e.g., via the operating system). The video driver 212 may interact with the operating system and capture the graphics or video output associated with the remote desktop session. In this regard, in initiating a remote desktop session, a video driver is activated to capture graphical information, which can be transmitted back to the client via the terminal service 210.

To facilitate graphical data encoding and/or data encapsulation in association with a video driver, or data acquisition process, the terminal service 210 may generate and/or provide an encoding indicator to the video driver. As used herein, an encoding indicator generally indicates or provides an instruction related to graphical data encoding. An encoding indicator may include a video encoding manager identifier and/or a video encoder identifier. In embodiments, the terminal service 210 may provide (e.g., via the RDP stack) the encoding indicator to the video driver via input/output control (IOCTL). In this way, an IOCTL interface may be used to communicate with the video driver. The encoding indicator may instruct the video driver to load or utilize a particular video encoding manager and/or video encoder (e.g., using a video encoding manager identifier and/or a video encoder identifier, respectively).

The particular video encoding manager identifier and/or video encoder identifier to provide in association with an encoding indicator may be identified or determined in any number of ways. In some cases, the encoding manager identifier and/or video encoder identifier may be provided by the remote desktop client device. For example, the remote desktop client device, the remote desktop client application, and/or the user may indicate or specify a particular video encoding manager identifier and/or video encoder identifier to use. In other cases, the remote desktop server (e.g., via the terminal service 220) may determine a particular encoding manager identifier and/or video encoder identifier. The particular video encoding manager and/or video encoder may be based on the type of remote desktop client device (or attributes associated therewith, such as resolution of the monitor), the type of data, the user, computational efficiency of the video encoder, and/or any other attribute or factor.

As described, the data acquisition process 216 generally performs data acquisition. That is, the data acquisition process 216 may obtain graphical data and provide graphical output (e.g., images or visual outputs) that can be displayed on a display screen. In accordance with embodiments described herein, the data acquisition process 216 is performed using the video driver 212 and the video encoding manager 214. At a high-level, the video driver 212 obtains graphical data and performs graphics processing, and the video encoding manager 214 manages encoding of the graphical data.

The video driver 212 is generally configured to obtain graphical data and, in some cases, process such data. To do so, the video driver 212 may communicate with the operating system and the graphics hardware (e.g., GPU) to manage graphics rendering and display management. In this way, the video driver 212 may facilitate communication between software and the display hardware. In some embodiments, the video driver 212 facilitates rendering of visual content (e.g., images) for display on the screen. As such, the video driver 212 may translate high-level graphics commands into instructions that the GPU or CPU can understand and execute. Such instructions may relate to colors, positions, transformations, layout details, or the like. In this way, the video driver 212 may communicate or interface with a graphics subsystem (e.g., GPU and/or CPU), which performs the rendering, to ensure correct display on monitors. For example, the GPU may process the rendering instructions provided by the video driver and generate actual pixel data for the final image. Such data may include the rendered frame, which includes pixel values representing color, depth information, and any additional rendering effects applied during the process (e.g., lighting, shadows, anti-aliasing). The rendered frame is the visual output of the rendering process, representing what the user may view on the screen. The rendered data (e.g., frame(s)) can then be returned to the video driver 212 for processing and/or communicating, for example, to the video encoding manger 214. For example, the video driver may take the rendered frame data (e.g., via a frame buffer) and prepare it for display (e.g., performing color space conversion, scaling, gramma correction, and/or other adjustments to ensure compatibility with the display hardware and settings). The graphical data (e.g., in the form of the rendered output or data processed therefrom) may then be communicated from the video driver. The video driver 212 may perform various functionalities, such as, for example, creating the graphics adapter representing the indirect display device; reporting connected and disconnected monitors; providing descriptions of connected monitors and available display modes; supporting other display functionality like hardware mouse cursor, gamma, I2C communications, and protected content; handling the desktop image processing for display; and implementing UMDF functionality such as device communications, power management, and plug-and-play.

In one embodiment, the video driver 212 is in the form of an indirect display driver (IDD) or a remote desktop protocol indirect display driver (also referred to as RDPIDD). An IDD or RDPIDD is generally implemented in cases in which monitors are indirectly connected. An IDD is used when rendering occurs indirectly, such as when using remote desktop services. In particular, graphics rendering occurs at the remote desktop server, but the output is displayed on a local remote desktop client device. An IDD or an RDPIDD may serve as a user-mode driver for the indirect display device. In embodiments, an IDD or RDPIDD may create a graphics adapter representation for the indirect display, report connected and disconnected monitors, provide monitor descriptions and available display modes, or the like.

In some cases, a video driver 112 in the form of an RDPIDD operates within the framework provided by a Windows Device Driver Model (WDDM). Stated differently, the RDPIPP is a subsystem of the WDDM. The WDDM provides a standardized interface between display drivers (e.g., user-mode device drivers) and the operating system. In some cases, a video driver 212, such as an RDPIDD, is implemented via a public API (e.g., Independent Display Driver for Console Extensions (IDDcx)).

In some embodiments, a video driver 212, such as an IDD, is implemented as a dynamic link library (DLL). A DLL includes code and functions that facilitate tasks performed by the video driver 212, such as obtaining graphical output and managing display-related tasks within a remote desktop session.

In some embodiments, a video driver 212 is initiated or loaded via a user-mode driver framework (UMDF). In this regard, the video driver 212 may be referred to as a user-mode driver or UMDF driver. UMDF is a framework for developing user-mode drivers in a Windows operating system. User-mode drivers run in user space rather than kernel space. In some cases, when a device requires the UMDF driver to be connected to the system, the plug-and-play subsystem of the operating system detects the device and identifies the corresponding or appropriate driver package. The plug-and-play subsystem can then initiate the device installation process. During the device installation process, the driver may be loaded into memory (e.g., via a UMDF loader component of the operating system). For example, the plug-and-play system may load or launch a Windows Graphic Foundation (WGF) host executable, which includes the video driver to initiate, download, or install. Once loaded into memory, the video driver is initialized, which may include executing the driver's entry point and initializing any data structures, resources, or runtime environments required by the video driver to function properly.

In accordance with embodiments herein, the video driver 212 obtains unencoded (e.g., raw) graphical data (e.g., rendered data). In some embodiments, unencoded graphical data is obtained from the operating system of the remote desktop server 204. The video driver 212 may capture unencoded graphical data from the operating system for a particular session. For example, for a user at a remote desktop client device, the operating system provides data to the video driver 212 in association with the particular remote desktop session associated with the user. In some cases, the video driver 212 obtains unencoded graphical data by intercepting graphical data generated or output by applications running on the remote desktop server's environment. Such graphical data may include windows, icons, dialog boxes, and/or any other graphical element produced by applications. In some cases, the video driver 212 is also configured to manage various display-related tasks within the remote desktop session. For example, the video driver 212 may manage tasks such as screen resizing, color depth adjustments, and cursor handling.

In accordance with embodiments described herein, video encoding occurs in association with the video driver 212. In this way, in some embodiments, the video driver 212 may perform video encoding in association with the graphical data. Video encoding refers to the process of encoding graphical data, including video as well as other visual elements displayed in association with a remote desktop. For example, video encoding may include encoding various types of graphical data generated by applications running on the remote desktop server, such as text, images, icons, videos, windows, and other visual elements.

In other embodiments, the video driver 212 communicates with the video encoding manager 214, or portion thereof (e.g., a video encoder), to facilitate graphical data encoding. In particular, the video driver 212 may provide the unencoded graphical data to the video encoding manager 214. In this way, the graphical data encoding occurs in association with the same data acquisition process 216 and, as such, may avoid the synchronization and copying of the unencoded data to the RDP stack 220, as required in conventional implementations.

In some cases, the video driver 212 identifies or determines a video encoding manager 214 and/or video encoder 240 with which to communicate. In this regard, the video driver 212 may identify which video encoder manager 214 and/or video encoder 240 to provide graphical data for encoding. For example, in some cases, multiple video encoding managers 214 may exist (e.g., for different remote desktop sessions or for different users). As another example, multiple video encoders may exist in association with a video encoding manager (e.g., to perform different encoding techniques). A particular video encoding manager 214 and/or video encoder 240 may be identified in association with the video driver 212. For example, the video driver 212 may have a video encoding manager identifier and/or video encoder identifier hard coded to indicate a desired video encoder manager and/or video encoder. In other examples, an encoding indicator may be received or obtained at the video driver 212 indicating a desired video encoding manager and/or video encoder. For instance, an encoding indicator may be generated and/or provided from the terminal service 210 (e.g., based on an instruction from a remote desktop client device or based on identifiers hard-coded in association with the terminal service or RDP stack) to the video driver 212 indicating a video encoding manager identifier and/or a video encoder identifier for use in performing graphical data encoding. A video encoding manager identifier provides an identification or indication of a particular video encoding manager to load and/or utilize, for example, in association with a remote desktop session. A video encoder identifier provides an identification or indication of a particular video encoder to load and/or utilize, for example, in association with a remote desktop session. In some examples, the encoding indicator is provided from the terminal service 210 via IOCTL. Based on the encoding indicator, the video driver 212 may communicate or direct graphical data accordingly. In some cases, upon the video driver obtaining the encoding indicator (e.g., via IOCTL at the beginning of a remote desktop session), the video driver 212 may initiate loading of the desired video encoding manager 214 and instantiate the desired video encoder 240.

To communicate with the video encoding manager 214, in some cases, the video driver 212 communicates via an interface, such as encoding interface 230. Encoding interface 230 facilitates a logical separation between video driver 212 and the video encoding manager 214, and tasks associated therewith. In some cases, the encoding interface 230 packages the graphical data obtained from the operating system in a different manner that is suitable to the video encoding manager 214, and/or video encoder(s) 240 associated therewith.

Video encoding manager 214 is generally configured to manage graphical data encoding, such as graphical data encoding performed by one or more of video encoders 240A-240N (generally referred to herein as video encoder 240). At a high-level, the video encoding manager 214, and/or a video encoder(s) associated therewith, obtains unencoded graphical data (e.g., raw frames) and applies an encoding technique to encode the graphical data for more efficient transmission to a remote desktop client device. In some embodiments, the video encoding manager 214 and/or video encoder(s) may also perform data encapsulation. The video encoding manager 214 and/or video encoders 240 may be initiated in any of a number of ways. In some cases, the video encoding manager 214 and/or video encoders 240 are initiated in conjunction with initiation of the video driver 212. For example, in association with a plug-and-play identifying to initiate the video driver 212, the video encoding manager 214 and/or video encoder(s) 240 may also be initiated or loaded. As one example, based on a plug-and-play detecting a display device and identifying to initiate the video driver 212, the Windows Display Driver Model (WDDM) may manage display-related tasks, including loading (e.g., into memory) the video driver 212, the video encoding manager 214, and/or a video encoder(s) 240. In other cases, the video driver 212 (e.g., upon being initiated) may initiate or load the video encoding manager 214 and/or a video encoder(s) 240. For instance, based on an encoding indicator (e.g., including a video encoding manager identifier and/or a video encoder identifier) obtained from the terminal service 210 (via an IOCTL interface), the designated video encoding manager and/or video encoder may be initiated or loaded. By way of example, assume a remote desktop client device has an HDR monitor. In such a case, the remote desktop client device can provide such an indication to the RDP stack 220, which can communicate such an attribute in association with a remote desktop session. Accordingly, the video driver 212 may identify that encoding is desired to be performed in association with an HDR encoder 240A. The HDR encoder 240A can be loaded or instantiated and graphical data provided thereto for encoding.

In some cases, the video encoding manager 214 may be in the form of a dynamic link library (DLL). A DLL refers to a file format, which may be used to hold multiple codes and procedures. A DLL allows for code to be shared among different programs, which can reduce disk space and memory usage. Further, a DLL may facilitate a more efficient management and updating of code. Using a DLL that is logically separated from the video driver, or DLL associated therewith, facilitates development of software (e.g., third-party software) that extends or enhances the encoding functionality without requiring modifications to the core video driver itself. As such, a DLL associated with a video driver 212 and a DLL associated with a video encoding manager 214 may be logically separate.

In some cases, the video encoding manager 214 may determine or select a video encoder 240 to use. As shown, the video encoding manager 214 includes various video encoders 240A-240N. A video encoding manager 214 may implement, include, or use any number or type of video encoders (e.g., as needed or suitable to a desired implementation). Although various video encoders are presented in FIG. 2, in some cases, the video encoding manager 214 may implement a single video encoder at a single point in time. In this way, only a single video encoder is active at a single point in time. As such, the video encoding manager 214 may load and/or unload a video encoder as needed.

A video encoder, such as video encoder 240, generally refers to a component that performs encoding of graphical data. In this way, a video encoder may convert graphical data from one format to another to compress it for storage or transmission purposes. By incorporating video encoders into a video encoding manager (e.g., a DLL), a developer can modularize the encoding functionality making it easier to manage and integrate into different software applications.

A video encoder may perform encoding in a particular manner. As such, various video encoders may exist that perform different techniques or manners of encoding graphical data. Examples of video encoders include an H264 video encoder, an H265 video encoder, an HDR video encoder, and a UMRDP video encoder. An H264 video encoder (not depicted) generally compresses raw graphical data using the H.264 (also referred to as Advanced Video Coding (AVC)) video compression standard, which applies various compression techniques to reduce the size of the data. An H265 video encoder 240B generally compresses raw graphical data using H.265 (also referred to as High Efficiency Video Coding (HEVC)) video compression standard. An HDR video encoder 240A generally encodes HDR content into a compressed video format. HDR refers to a technology that allows for a wider range of luminance levels and color gamut compared to standard dynamic range (SDR) content, resulting in more vibrant and lifelike images. An HDR encoder applies compression techniques to reduce the size of the HDR content while preserving its HDR characteristics. One example of an HDR encoder is H265 High Efficiency Video Coding (HEVC) HEVC444. A UMRDP encoder 240N generally refers to an encoder in association with UMRDP. Various alternative or additional video encoders may be used to provide options for adjusting compression levels, bitrates, resolution, and other parameters to optimize the encoding process for specific use cases.

In some cases, to determine or select a video encoder 240 to use, the video encoding manager 214 may utilize an encoder indicator, for example, that specifies a video encoder. An encoder indicator generally indicates or provides an instruction related to graphical data encoding. For example, the encoder indicator may instruct the video driver to load and/or use a particular video encoding manager and/or video encoder (e.g., using a video encoding manager identifier and/or a video encoder identifier, respectively). In this regard, an encoding indicator may include a video encoding manager identifier and/or a video encoder identifier. In embodiments, the terminal service 210, such as the RDP stack 220 may provide the encoding indicator to the video driver, for example, via IOCTL. The encoder indicator, or data associated therewith, can then be provided to the video encoding manager 214, for example for use in selecting a video encoder 240 to use to encode graphical data.

The video encoder 240 encodes graphical data, such as graphical data obtained or output by video driver 212. For example, the video driver 212 may obtain and/or generate graphical output, such as images, GUI elements, and text rendered in specific fonts, understandable by the graphics hardware. Generally, graphical data is typically encoded using video compression techniques, such as Remote FX or H.264. As such, the video encoders described herein generally encode using video compression techniques. Such compression algorithms reduce the size of the graphical data for efficient transmission over the network, thereby optimizing performance and responsiveness during remote desktop sessions. In some cases, however, it may be desirable to convert the graphical output into a text-based representation. For example, character encoding for transmitting textual data and control messages may be performed. As such, an encoding process may, in some cases, encode the graphical data into a sequence of characters using a specific character encoding (e.g., UTF-8). Text-based characters can be used to represent graphical elements, including lines, boxes, and symbols. The remote desktop client display can interpret the encoded characters and displays them on the screen. For example, the remote desktop client device may map the encoded graphical elements back to their visual representations. The remote desktop client's display capabilities may determine how accurately the original graphics are represented.

In accordance with encoding graphical data, the encoded graphical data is communicated to the terminal service 210 for providing to the remote desktop client device, such as remote desktop client device 102 of FIG. 1. In particular, the encoded graphical data may be communicated to the RDP stack 220 of the terminal service 210 for providing to the remote desktop client device.

The encoded graphical data may be communicated to the RDP stack 220 of the terminal service 210 in a number of ways. In one embodiment, the encoded graphical data is provided to the video driver 212 for providing to the RDP stack 220 (e.g., the transport 222 of the RDP stack). As one example, the video driver 212 may communicate the encoded graphical data using File Input/Output (File I/O) 280. File I/O generally refers to the process of reading from and writing to files on a computer's storage system (e.g., in an asynchronous manner). File I/O may be used to extract encoded graphical data (e.g., frames). In some cases, File I/O opens a channel directly to the video driver, providing greater control over data reads and writes. Although File I/O is provided as an example, other delivery mechanisms may be used between the video driver 212 and the RDP stack 220. For example, encoded graphical data (e.g., frames) may be communicated using named pipes or dynamic virtual channels. As another example, a direct connection (e.g., TCP connection) may be used to communicate encoded graphical data to the RDP stack 220. Any of such delivery mechanisms from the video driver 212 to the RDP stack 220 reduces resources utilization otherwise needed to perform copying and synchronization tasks.

In another embodiment, encoded graphical data is provided directly from the video encoding manager 214, or the video encoder 240, to the RDP stack 220. For instance, communication between a video encoder and RDP stack 220 may occur using an RDP surface 250 and an update channel 260. By way of example, in instances in which a UMRDP encoder 240N is used to encode graphical data, the graphical data may be sent to the RDP stack 220 via the RDP surface 250 and/or update channel 260. RDP surface generally refers to the shared memory between the two different processes. In this way, the RDP surface is the area or buffer where graphical data is temporarily stored before being transmitted over the RDP connection. Generally, the RDP surface supports synchronous operations. In this way, graphical data is copied into the RDP surface and then the terminal service copies the data out of the shared memory (e.g., based on a notification indicating the data is available in shared memory). After the data is removed from the shared memory, the shared memory can be unlocked for the next data or frame. The update channel 260 generally communicates information indicating what portion is changed from one frame to a next frame. In implementations using an RDP surface 250 and/or an update channel 260, although data is copied, the data is encoded. As such, resource utilization is reduced by synchronizing and copying encoded graphical data.

In receiving the encoded data, the RDP stack 220 provides the encoded graphical data to the remote desktop client device, such as remote desktop client device 102. The remote desktop client device receives the encoded graphical data (e.g., frames), decodes the data, and presents via a display of the remote desktop client device.

Figure 3:
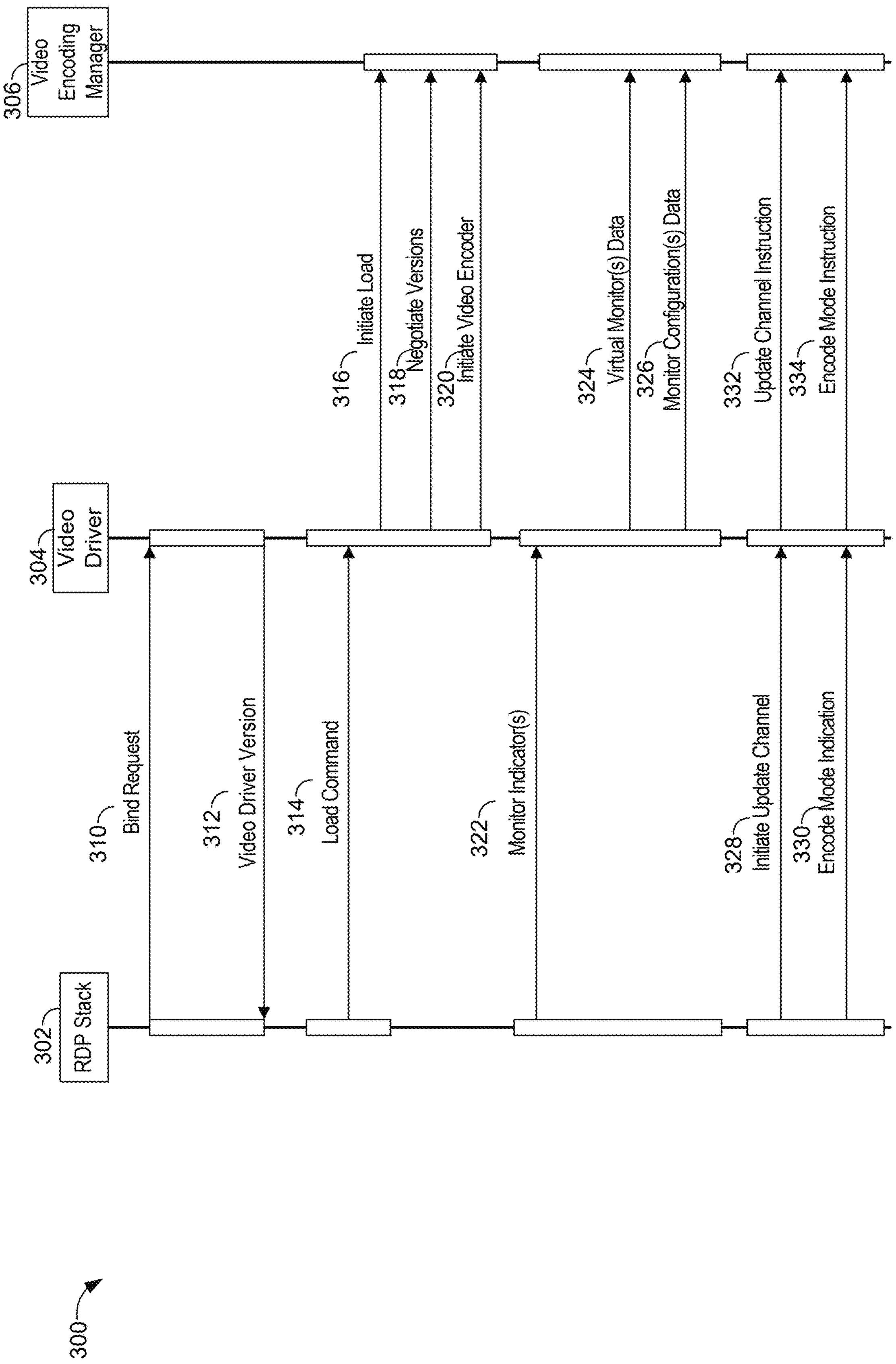
FIG. 3 provides an illustration of a flow diagram between an RDP stack, a video driver, and a video encoding manager, in accordance with embodiments of the present technology.

With reference to FIG. 3, FIG. 3 provides an illustration of a flow diagram 300 between an RDP stack 302, a video driver 304, and a video encoding manager 306. In particular, the flow diagram 300 illustrates the initialization control flow. Such components reside within a remote desktop server, such as remote desktop server 204 of FIG. 2. In embodiments, the RDP stack 302 is a component of a terminal service, such as terminal service 210 of FIG. 2, of the remote desktop server. The video encoding manager 306 may be a DLL that implements a collection of video encoders. In embodiments, the RDP stack 302 may control which video encoding manager and/or video encoder the video driver should load for a particular connection. In this way, the video encoding manager 306 may be dynamically loaded by the video driver on demand. At a high level, the RDP stack 302 provides the video driver 304 an encoding indicator providing an identification of the video encoding manager to load and an identification of a video encoder to instantiate and to which to provide graphical data for encoding and/or further processing.

As illustrated in FIG. 3, the RDP stack 302 connects or binds the video driver 304 using a bind request 310 provided from the RDP stack 302 to the video driver 304. In response, the video driver 304 may verify the requestor and record a binding process identifier. In addition, the video driver 304 may provide a video driver version 312 back to the RDP stack 302. In accordance with an effective binding between the RDP stack 302 and the video driver 304, the RDP stack 302 may identify a video encoding manager and/or video encoder for utilization in performing graphical data encoding and/or processing. A video encoding manager and/or video encoder may be selected based on any number of attributes. For example, the RDP stack 302 may identify a video encoding manager and/or video encoder based on a video driver version. In some cases, such a video encoding manager and/or video encoder may be indicated via a registry key. In other cases, such a video encoding manager and/or video encoder may be indicated or communicated by the remote desktop client device to the RDP stack 302. Upon identifying or selecting a video encoding manager and/or video encoder, a load command 314 may be communicated from the RDP stack 302 to the video driver 304. The load command 314 may include an encoding indicator indicating the video encoding manager and/or video encoder to load and/or utilize.

In receiving the load command 314, the video driver 304 may verify the requester. The video driver 304 may also initiate loading 316 of the video encoding manager 306, negotiate versions 318, and/or initiate 320 a desired video encoder. In some cases, the video driver 304 may initiate or instantiate a desired video encoder. In other cases, the video driver 304 may provide an identification of the desired video encoder, which can be used by the video encoding manager 306 to initiate the video encoder.

Returning to the RDP stack 302, the RDP stack can communicate a monitor indicator(s) 322 to the video driver 304. The monitor indicator(s) may include an indication of a monitor(s) being used, or attributes associated therewith. For instance, a monitor indicator may include an indication of a type of monitor(s), a monitor layout, or the like. The video driver 304 may then create a virtual monitor(s) and/or update monitor configuration(s) in accordance therewith. In this regard, data associated with a virtual monitor(s) 324 and/or monitor configuration(s) 326 may be communicated to the video encoding manager 306. The video encoding manager 306, or a portion thereof, may utilize virtual monitors and/or monitor configurations to perform data processing. As such, the video driver 304 may create monitor context objects that indicate a virtual monitor(s) and/or monitor configuration(s).

The RDP stack 302 can also provide an update channel (e.g., UMRDP update channel) initialization 328 and an encode mode indication 330 to the video driver 304 (e.g., via IOCTL). An instruction related to the update channel initialization 332 and the encode mode 334 can then be provided to the video encoding manager 306. The update channel initialization may initiate an update channel for communication, such as for use in communicating update information. The encode mode generally indicates a mode to use for encoding. As one example, an encode mode may indicate to use a GPU for encoding graphical data. As another example, an encode mode may indicate to use CPU for encoding graphical data.

Figure 4:
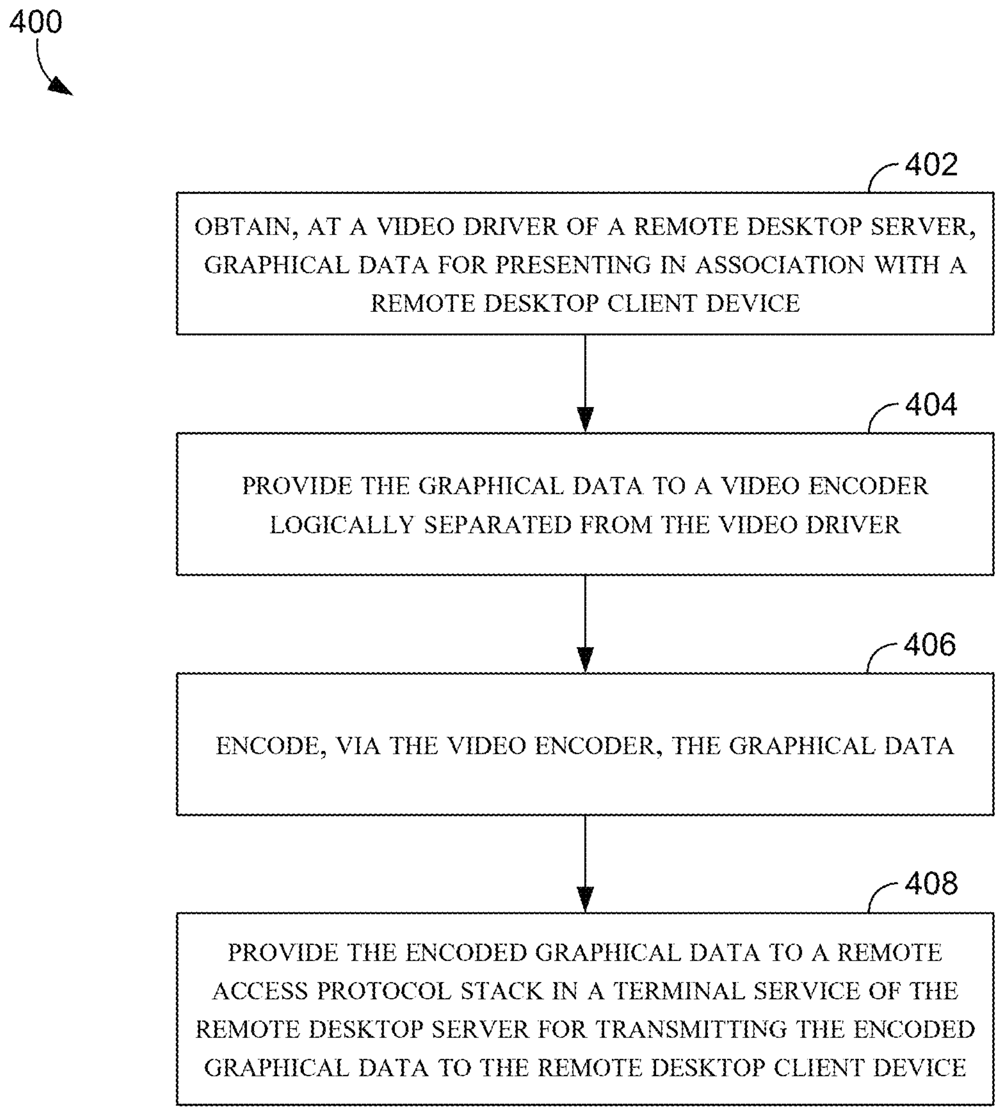
FIG. 4 provides a first example method for facilitating advanced video encoding in a remote desktop environment, in accordance with aspects of the technology described herein.
Figure 5:
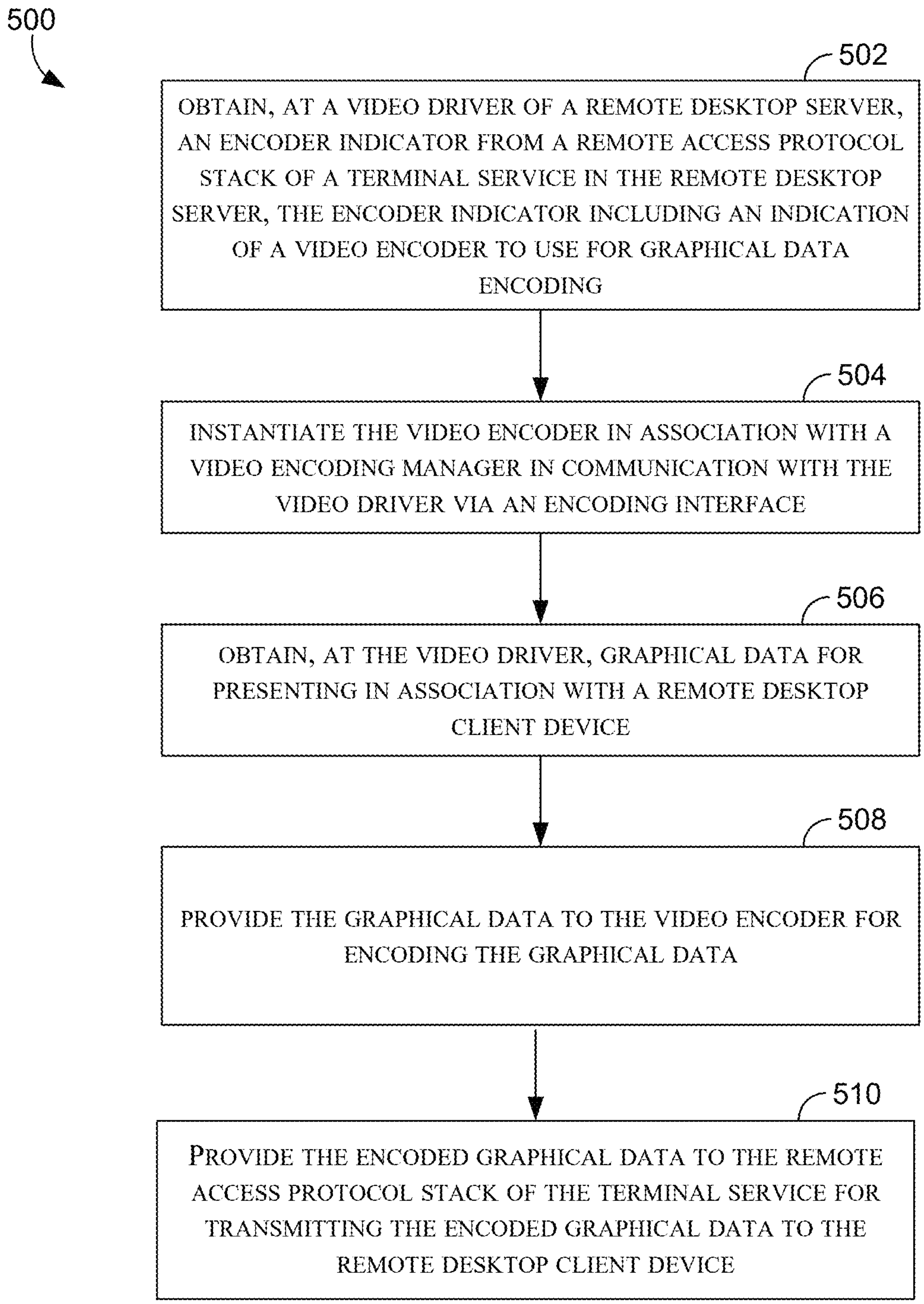
FIG. 5 provides a second example method for facilitating advanced video encoding in a remote desktop environment, in accordance with aspects of the technology described herein.
Figure 6:
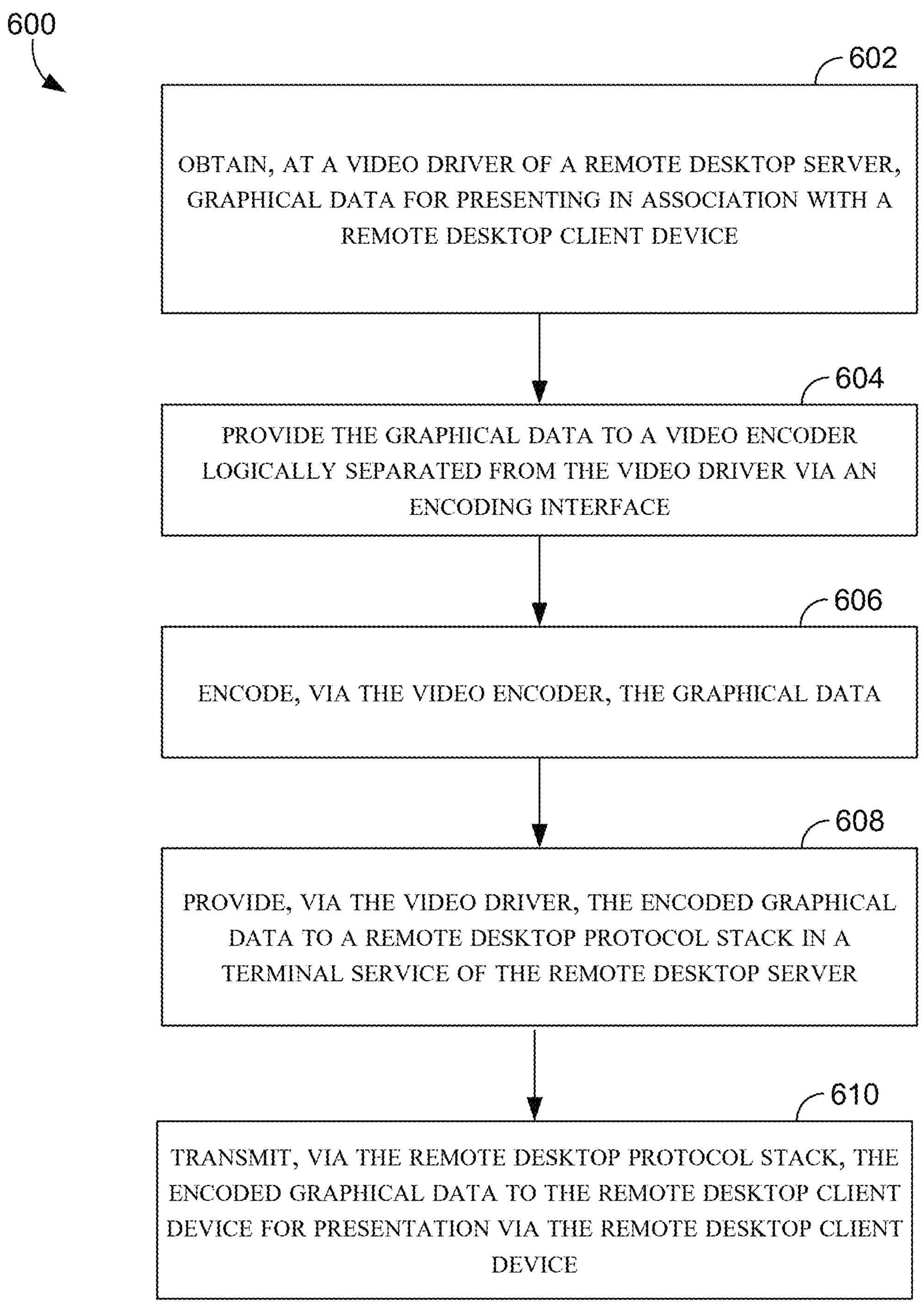
FIG. 6 provides a third example method for facilitating advanced video encoding in a remote desktop environment, in accordance with aspects of the technology described herein.

Exemplary Implementations for Facilitating Advanced Video Encoding in a Remote Desktop Environment As described, various implementations can be used in accordance with embodiments described herein. FIGS. 4-6, FIGS. 4-6 provide example methods of facilitating advanced video encoding in a remote desktop environment. Methods 400, 500, and 600 can be performed by a computer device, such as device 700 described below. The flow diagrams represented in FIGS. 4-6 are intended to be exemplary in nature and not limiting.

Turning initially to method 400 of FIG. 4, method 400 is directed to facilitating advanced video encoding in a remote desktop environment, in accordance with embodiments of the present technology. Initially, at block 402, graphical data for presenting in association with a remote desktop client device is obtained at a video driver of a remote desktop server. In embodiments, the graphical data includes data rendered by a graphics processing unit or a central processing unit based on an instruction provided by the video driver. For example, the video driver may provide rendering instructions to a hardware or software component performing the encoding and, in response, obtain the rendered data. The video driver may, in some cases, process the rendered data to prepare the data for presentation via a remote desktop client device. In some cases, the graphical data is obtained at the video driver via a frame buffer that stores data rendered by a graphics processing unit or central processing unit.

At block 404, the graphical data is provided to a video encoder logically separated from the video driver. In embodiments, the graphical data is provided to the video encoder via an encoding interface. The video encoder may be initiated in any number of ways. As one example, the video encoder is initiated based on an encoding indicator, communicated by the remote access protocol stack to the video driver, that includes an indication of the video encoder to use for encoding in association with a remote desktop session. The encoding indicator may be communicated to the video driver in accordance with establishing the remote desktop session. In some cases, the encoding indicator further includes an indication of a dynamic link library or video encoding manager that includes the video encoder.

At block 406, the graphical data is encoded via the video encoder. As can be appreciated, any type of video encoder may be used to encode graphical data. As one example, the video encoder may be a hardware or software component used to encode video content that includes high dynamic range information.

At block 408, the encoded graphical data is provided to a remote access protocol stack in a terminal service of the remote desktop server for transmitting the encoded graphical data to the remote desktop client device. In one embodiment, the encoded graphical data is provided from the video encoder to the video driver for providing to the remote access protocol stack via a file input/output communication channel. In some cases, the video encoder includes remote access protocol code to communicate the encoded graphical data.

Turning to method 500 of FIG. 5, method 500 is directed to facilitating advanced video encoding in a remote desktop environment, in accordance with embodiments of the present technology. Initially, at block 502, an encoder indicator is obtaining at a video driver of a remote desktop server from a remote access protocol stack of a terminal service in the remote desktop server. The encoder indicator may include an indication of a video encoder to use for graphical data encoding. In some embodiments, the encoder indicator further includes an indication of the video encoding manager and, based on the indication of the video encoding manager, initiating the video encoding manager.

At block 504, the video encoder is instantiated in association with a video encoding manager in communication with the video driver via an encoding interface. For example, based on the encoder indicator indicating a particular video encoder, the video driver may instantiate the particular video encoder for use in encoding data.

At block 506, graphical data is obtained at the video driver for presenting in association with a remote desktop client device. Such graphical data may be obtained, for example, from a frame buffer including frames rendered by a rendering component, such as a GPU and/or CPU. At block 508, the graphical data is provided to the video encoder for encoding the graphical data. In some cases, the video encoder to use for graphical data encoding is identified at the remote access protocol stack based on information provided by the remote desktop client device.

At block 510, the encoded graphical data is provided to the remote access protocol stack of the terminal service for transmitting the encoded graphical data to the remote desktop client device. In some embodiments, the video encoder provides the encoded graphical data, via the encoding interface, to the video driver to provide to the remote access protocol stack. In other embodiments, the video encoder directly provides the encoded graphical data to the remote access protocol stack.

Turning to method 600 of FIG. 6, method 600 is directed to facilitating advanced video encoding in a remote desktop environment, in accordance with embodiments of the present technology. Initially, at block 602, graphical data is obtained at a video driver of a remote desktop server for presenting in association with a remote desktop client device. Such graphical data may be obtained, for example, from a frame buffer including frames rendered by a rendering component, such as a GPU and/or CPU.

At block 604, the graphical data is provided to a video encoder logically separated from the video driver via an encoding interface. In embodiments, the video driver corresponds with a remote desktop session, and the video driver instantiates the video encoder based on receiving an indication to use the video encoder in association with the remote desktop session. In some cases, the video encoder corresponds with a dynamic link library initiated based on receiving an indication to use the dynamic link library in association with a remote desktop session.

At block 606, the graphical data is encoded via the video encoder. In some embodiments, the video encoder is a high efficiency video coding encoder or an advanced video coding encoder. In other embodiments, the video encoder is a hardware or software component used to encode video content that includes high dynamic range information. At block 608, the encoded graphical data is provided, via the video driver, to a remote desktop protocol stack in a terminal service of the remote desktop server. Thereafter, at block 610, the encoded graphical data is transmitted, via the remote desktop protocol stack, to the remote desktop client device for presentation via the remote desktop client device.

Accordingly, we have described various aspects of technology directed to systems, and methods for facilitating efficient advanced video encoding in a remote desktop environment. It is understood that various features, subcombinations, and modifications of the embodiments described herein are of utility and may be employed in other embodiments without reference to other features or subcombinations. Moreover, the order and sequences of steps shown in the example methods 400, 500, and 600 are not meant to limit the scope of the present disclosure in any way, and in fact, the steps may occur in a variety of different sequences within embodiments hereof. Such variations and combinations thereof are also contemplated to be within the scope of embodiments of this disclosure.

In some embodiments, a computerized system, such as the computerized system described in any of the embodiments above, comprises one or more processors, and one or more computer storage media storing computer-useable instructions that, when executed by the one or more processors, cause the one or more processors to perform operations. The operations comprise obtaining, at a video driver of a remote desktop server, graphical data for presenting in association with a remote desktop client device. The operations may further comprise providing the graphical data to a video encoder logically separated from the video driver. The operations may further comprise encoding, via the video encoder, the graphical data. The operations may further comprise providing the encoded graphical data to a remote access protocol stack in a terminal service of the remote desktop server for transmitting the encoded graphical data to the remote desktop client device. In this way, embodiments of this disclosure enable an improved implementation of video encoding in a remote desktop environment. Further, in this way, embodiments, as described herein, reduce computing resources used in performing video encoding by limiting or avoiding synchronizing and/or copying unencoded data from the video driver to the remote access protocol stack.

In any combination of the above embodiments of the computerized system, the graphical data comprises data rendered by a graphics processing unit or a central processing unit based on an instruction provided by the video driver.

In any combination of the above embodiments of the computerized system, the encoded graphical data is provided from the video encoder to the video driver for providing to the remote access protocol stack via a file input/output communication channel.

In any combination of the above embodiments of the computerized system, the graphical data is provided to the video encoder via an encoding interface.

In any combination of the above embodiments of the computerized system, the graphical data is obtained at the video driver via a frame buffer that stores data rendered by a graphics processing unit or central processing unit.

In any combination of the above embodiments of the computerized system, the video encoder includes remote access protocol code to communicate the encoded graphical data.

In any combination of the above embodiments of the computerized system, the video encoder is initiated based on an encoding indicator, communicated by the remote access protocol stack to the video driver, that includes an indication of the video encoder to use for encoding in association with a remote desktop session.

In any combination of the above embodiments of the computerized system, the encoding indicator is communicated in accordance with establishing the remote desktop session.

In any combination of the above embodiments of the computerized system, the encoding indicator further includes an indication of a dynamic link library that includes the video encoder.

In any combination of the above embodiments of the computerized system, the video encoder comprises a hardware of software component used to encode video content that includes high dynamic range information.

In other embodiments, a computer-implemented method is provided. The method includes obtaining, at a video driver of a remote desktop server, an encoder indicator from a remote access protocol stack of a terminal service in the remote desktop server, the encoder indicator including an indication of a video encoder to use for graphical data encoding. The method may further include instantiating the video encoder in association with a video encoding manager in communication with the video driver via an encoding interface. The method may further include causing obtaining, at the video driver, graphical data for presenting in association with a remote desktop client device. The method may further include providing the graphical data to the video encoder for encoding the graphical data. The method may further include providing the encoded graphical data to the remote access protocol stack of the terminal service for transmitting the encoded graphical data to the remote desktop client device. In this way, embodiments of this disclosure enable an improved implementation of video encoding in a remote desktop environment. Further, in this way, embodiments, as described herein, reduce computing resources used in performing video encoding by limiting or avoiding synchronizing and/or copying unencoded data from the video driver to the remote access protocol stack.

In any combination of the above embodiments of the computer-implemented method, the method may further include the video encoder to use for graphical data encoding is identified at the remote access protocol stack based on information provided by the remote desktop client device.

In any combination of the above embodiments of the computer-implemented method, the encoder indicator further includes an indication of the video encoding manager and, based on the indication of the video encoding manager, initiating the video encoding manager.

In any combination of the above embodiments of the computer-implemented method, the video encoder provides the encoded graphical data, via the encoding interface, to the video driver to provide to the remote access protocol stack.

In any combination of the above embodiments of the computer-implemented method, the video encoder directly provides the encoded graphical data to the remote access protocol stack.

In other embodiments, one or more computer storage media having computer-executable instructions embodied thereon that, when executed by one or more processors, cause the one or more processors to perform a method is provided. The method includes obtaining, at a video driver of a remote desktop server, graphical data for presenting in association with a remote desktop client device. The method also includes providing the graphical data to a video encoder logically separated from the video driver via an encoding interface. The method may further includes encoding, via the video encoder, the graphical data. The method may further includes providing, via the video driver, the encoded graphical data to a remote desktop protocol stack in a terminal service of the remote desktop server. The method may also include transmitting, via the remote desktop protocol stack, the encoded graphical data to the remote desktop client device for presentation via the remote desktop client device. In this way, embodiments of this disclosure enable an improved implementation of video encoding in a remote desktop environment. Further, in this way, embodiments, as described herein, reduce computing resources used in performing video encoding by limiting or avoiding synchronizing and/or copying unencoded data from the video driver to the remote access protocol stack.

In any combination of the above embodiments of the media, the video driver corresponds with a remote desktop session, and the video driver instantiates the video encoder based on receiving an indication to use the video encoder in association with the remote desktop session.

In any combination of the above embodiments of the media, the video encoder corresponds with a dynamic link library initiated based on receiving an indication to use the dynamic link library in association with a remote desktop session.

In any combination of the above embodiments of the media, the video encoder comprises a high efficiency video coding encoder or an advanced video coding encoder.

In any combination of the above embodiments of the media, the video encoder comprises a hardware of software component used to encode video content that includes high dynamic range information.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 7:
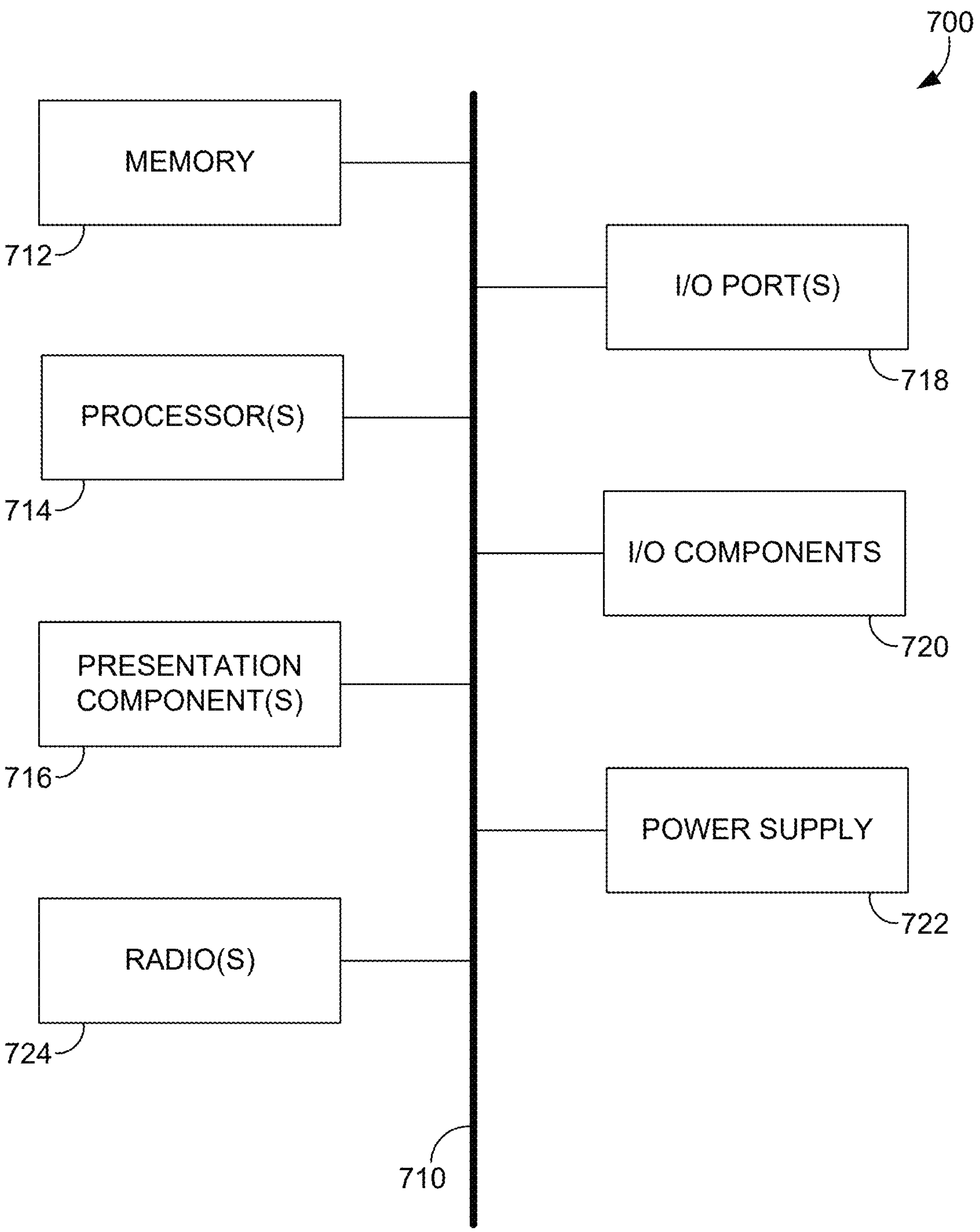
FIG. 7 is a block diagram of an exemplary computing environment suitable for use in implementing aspects of the technology described herein.

Referring to the drawings in general, and to FIG. 7 in particular, an exemplary operating environment for implementing aspects of the technology described herein is shown and designated generally as computing device 700. Computing device 700 is just one example of a suitable computing environment and is not intended to suggest any limitation as to the scope of use or functionality of the technology described herein. Neither should the computing device 800 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, an illustrative power supply 722, and a radio(s) 724. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 7 is merely illustrative of an exemplary computing device that can be used in connection with one or more aspects of the technology described herein. Distinction is not made between such categories as “workstation,” “server,” “laptop,” and “handheld device,” as all are contemplated within the scope of FIG. 7 and refer to “computer” or “computing device.”

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Exemplary memory includes solid-state memory, hard drives, and optical-disc drives. Computing device 700 includes one or more processors 714 that read data from various entities such as bus 710, memory 712, or I/O components 720. Presentation component(s) 716 present data indications to a user or other device. Exemplary presentation components 716 include a display device, speaker, printing component, and vibrating component. I/O port(s) 718 allow computing device 700 to be logically coupled to other devices including I/O components 720, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 700. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include radio(s) 724. The radio 724 transmits and receives radio communications. The computing device may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A computing system comprising:

a processor; and computer storage memory having computer-executable instructions stored thereon which, when executed by the processor, configure the computing system to perform operations comprising:

obtaining, at a video driver of a remote desktop server, graphical data for presenting in association with a remote desktop client device;

receiving, by the video driver, from a remote access protocol stack in a terminal service of the remote desktop server, an encoding indicator that includes an indication of a video encoder to be used for encoding in association with a remote desktop session, wherein the video encoder is logically separated from the video driver;

initiating the video encoder based on the encoding indicator;

providing the graphical data to the video encoder;
encoding, via the video encoder, the graphical data; and
providing the encoded graphical data to the remote access protocol stack for transmitting the encoded graphical data to the remote desktop client device.

2. The computing system of claim 1, wherein the graphical data comprises data rendered by a graphics processing unit or a central processing unit based on an instruction provided by the video driver.

3. The computing system of claim 1, wherein the encoded graphical data is provided from the video encoder to the video driver for providing to the remote access protocol stack via a file input/output communication channel.

4. The computing system of claim 1, wherein the graphical data is provided to the video encoder via an encoding interface.

5. The computing system of claim 1, wherein the graphical data is obtained at the video driver via a frame buffer that stores data rendered by a graphics processing unit or central processing unit.

6. The computing system of claim 1, wherein the video encoder includes remote access protocol code to communicate the encoded graphical data.

7. The computing system of claim 1, wherein the encoding indicator is communicated in accordance with establishing the remote desktop session.

8. The computing system of claim 1, wherein the encoding indicator further includes an indication of a dynamic link library that includes the video encoder.

9. The computing system of claim 1, wherein the video encoder comprises a hardware or software component used to encode video content that includes high dynamic range information.

10. A computer-implemented method comprising:
obtaining, at a video driver of a remote desktop server, an encoder indicator from a remote access protocol stack of a terminal service in the remote desktop server, the encoder indicator including an indication of a video encoder to use for graphical data encoding;
instantiating the video encoder in association with a video encoding manager in communication with the video driver via an encoding interface;
obtaining, at the video driver, graphical data for presenting in association with a remote desktop client device;
providing the graphical data to the video encoder for encoding the graphical data; and
providing the encoded graphical data to the remote access protocol stack of the terminal service for transmitting the encoded graphical data to the remote desktop client device.

11. The method of claim 10, wherein the video encoder to use for graphical data encoding is identified at the remote access protocol stack based on information provided by the remote desktop client device.

12. The method of claim 10, wherein the encoder indicator further includes an indication of the video encoding manager and, based on the indication of the video encoding manager, initiating the video encoding manager.

13. The method of claim 10, wherein the video encoder provides the encoded graphical data, via the encoding interface, to the video driver to provide to the remote access protocol stack.

14. The method of claim 10, wherein the video encoder directly provides the encoded graphical data to the remote access protocol stack.

15. One or more computer storage media having computer-executable instructions embodied thereon that, when executed by one or more processors, cause the one or more processors to perform a method, the method comprising:
obtaining, at a video driver of a remote desktop server, graphical data for presenting in association with a remote desktop client device;
receiving, by the video driver, an indication of a dynamic link library including a video encoder to be used in association with a remote desktop session, wherein the video encoder is logically separated from the video driver via an encoding interface;
initiating the dynamic link library based on the indication;
providing the graphical data to the video encoder
encoding, via the video encoder, the graphical data; and
providing, via the video driver, the encoded graphical data to a remote desktop protocol stack in a terminal service of the remote desktop server for transmission to and presentation via the remote desktop client device.

16. The media of claim 15, wherein the video encoder comprises a high efficiency video coding encoder or an advanced video coding encoder.

17. The media of claim 15, wherein the video encoder comprises a hardware of software component used to encode video content that includes high dynamic range information.

* * * * *